United States Patent
Kwon et al.

(10) Patent No.: US 10,462,661 B2
(45) Date of Patent: Oct. 29, 2019

(54) METHOD AND DEVICE FOR TRANSMITTING/RECEIVING DATA USING BLUETOOTH MESH NETWORK

(71) Applicant: LG ELECTRONICS INC., Seoul (KR)

(72) Inventors: Younghwan Kwon, Seoul (KR); Jinkwon Lim, Seoul (KR); Youngjun Jo, Seoul (KR); Jingu Choi, Seoul (KR); Taeyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 15/570,140

(22) PCT Filed: Mar. 23, 2016

(86) PCT No.: PCT/KR2016/002947
§ 371 (c)(1),
(2) Date: Oct. 27, 2017

(87) PCT Pub. No.: WO2016/175454
PCT Pub. Date: Nov. 3, 2016

(65) Prior Publication Data
US 2018/0132102 A1 May 10, 2018

Related U.S. Application Data

(60) Provisional application No. 62/154,741, filed on Apr. 30, 2015, provisional application No. 62/180,622, filed on Jun. 17, 2015.

(51) Int. Cl.
*H04L 29/06* (2006.01)
*H04W 12/06* (2009.01)
(Continued)

(52) U.S. Cl.
CPC ....... *H04W 12/06* (2013.01); *H04W 28/0215* (2013.01); *H04W 40/24* (2013.01);
(Continued)

(58) Field of Classification Search
CPC .............................. H04W 12/06; H04W 28/02
(Continued)

(56) References Cited

U.S. PATENT DOCUMENTS 5,600,629 A * 2/1997 Van Daele ........... H04B 7/1856
370/316
2006/0280152 A1* 12/2006 Lee ...................... H04W 72/042
370/338
(Continued)

FOREIGN PATENT DOCUMENTS

| JP | 2008-141508 A | 6/2008 |
| KR | 10-2007-0035851 A | 4/2007 |
| KR | 10-2014-0114751 A | 9/2014 |

*Primary Examiner* — Anthony D Brown
(74) *Attorney, Agent, or Firm* — Birch, Stewart, Kolasch & Birch, LLP

(57) ABSTRACT

The present invention relates to a method and a device for a first device transmitting data to a second device in a Bluetooth mesh network. A method and a device may be provided, according to the present invention, wherein an advertising message is received from a second device forming a mesh network, the advertising message comprising a first type field indicating that the advertising message is an advertising message transmitted from a device of the mesh network, and a connection is made to the mesh network on the basis of the advertising message, and a control message comprising a parameter indicating a certain operation is transmitted to the second device through the mesh network, wherein the control message comprises at least one among the address of a first device, the address of the second device, the number of relays as a value, or a second type field indicating the type of the control message.

10 Claims, 17 Drawing Sheets

(51) Int. Cl.
*H04W 40/24* (2009.01)
*H04W 84/18* (2009.01)
*H04W 28/02* (2009.01)
H04W 4/80 (2018.01)
H04W 88/04 (2009.01)
H04W 12/04 (2009.01)

(52) U.S. Cl.
CPC ........... *H04W 84/18* (2013.01); *H04L 63/126* (2013.01); *H04W 4/80* (2018.02); *H04W 12/04* (2013.01); *H04W 88/04* (2013.01)

(58) Field of Classification Search
USPC .......................................................... 726/4
See application file for complete search history.

(56) References Cited

U.S. PATENT DOCUMENTS

| | | |
|---|---|---|
| 2015/0081840 A1 | 3/2015 | Patil et al. |
| 2015/0085696 A1 | 3/2015 | Guo et al. |

* cited by examiner

Mesh network protocol stack

Advertising packet format

METHOD AND DEVICE FOR TRANSMITTING/RECEIVING DATA USING BLUETOOTH MESH NETWORK

CROSS REFERENCE TO RELATED APPLICATIONS

This application is the National Phase of PCT International Application No. PCT/KR2016/002947, filed on Mar. 23, 2016, which claims priority under 35 U.S.C. 119(e) to U.S. Provisional Application No. 62/154,741, filed on Apr. 30, 2015, and No. 62/180,622, filed on Jun. 17, 2015, all of which are hereby expressly incorporated by reference into the present application.

TECHNICAL FIELD

The present invention relates to a method and device for transmitting/receiving data between devices using Bluetooth, that is, a short-distance technology, in a wireless communication system and, more particularly, to a method and device for Bluetooth devices to transmit/receive data by forming a mesh network.

BACKGROUND ART

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) with low power consumption. Such a Bluetooth low energy technology allows devices to exchange information with each other by utilizing an attribute protocol. The Bluetooth LE method may reduce energy consumption by reducing overhead of a header and simplifying an operation.

Some products of the Bluetooth devices do not have a display or a user interface. Complexity of connection, management, control, and disconnection among various types of Bluetooth devices and Bluetooth device employing similar technologies has increased.

Bluetooth supports a high speed with relatively low power consumption and at relatively low cost. However, since a transmission distance thereof is a maximum of 100 m, and thus, Bluetooth is appropriately used within a limited space.

DISCLOSURE

Technical Problem

An object of the present invention is to provide a method for transmitting/receiving data using a Bluetooth low energy (LE) technology.

Furthermore, an object of the present invention is to provide a method for Bluetooth devices to transmit/receive data by forming a mesh network.

Furthermore, an object of the present invention is to provide a method for Bluetooth devices to transmit/receive data to/from a device in a remote place through a relay method by forming a mesh network.

Furthermore, an object of the present invention is to provide a method for a Bluetooth device to discover a surrounding mesh network in order to connect to a mesh network.

Furthermore, an object of the present invention is to provide a data format for a Bluetooth device to discover a surrounding mesh network in order to connect to a mesh network.

Furthermore, an object of the present invention is to provide a method for a Bluetooth device to obtain the address of a device attempting to transmit data over a mesh network.

Furthermore, an object of the present invention is to provide a data format for a Bluetooth device to obtain the address of a device attempting to transmit data over a mesh network.

Furthermore, an object of the present invention is to provide a method for a Bluetooth device to receive a response to data transmitted over a mesh network.

Furthermore, an object of the present invention is to provide a data format for a Bluetooth device to receive a response to data transmitted over a mesh network.

Technical objects to be achieved in this specification are not limited to the aforementioned objects, and those skilled in the art to which the present invention pertains may evidently understand other technological objects from the following description.

Technical Solution

In order to solve the aforementioned problems, the present invention provides a method for a first device to transmit data to a second device in a Bluetooth mesh network, including the steps of receiving, from the second device establishing the mesh network, an advertisement message including a first type field indicating a message transmitted from a device of the mesh network; accessing the mesh network based on the advertisement message; and transmitting a control message including a parameter indicating a specific operation to the second device through the mesh network, wherein the control message includes at least one of an address of the first device, an address of the second device, a relay count value, or a second type field indicating a type of the control message.

Furthermore, the present invention further includes the step of receiving a response message indicating a result of the specific operation from the second device when the second type field indicates a type requiring a response to the control message.

Furthermore, in the present invention, the control message includes at least one of operation code indicating the type of control message and an identifier for the transmission and reception of the message.

Furthermore, in the present invention, the control message further includes the operation code, first authentication code for authenticating the parameter or second authentication code for authenticating the control message.

Furthermore, in the present invention, the control message is received by the relay operation of at least one relay device.

Furthermore, in the present invention, the relay number value is decreased whenever relay is performed, and the advertising message is not retransmitted when the relay number value is '1'.

Furthermore, in the present invention, the advertising message is periodically broadcasted.

Furthermore, the present invention further includes the step of receiving a second advertising message including the address of the second device from the second device.

Furthermore, the present invention provides a device for transmitting data in a Bluetooth mesh network, including a communication unit for performing communication with the outside in a wired or wireless manner; and a processor functionally coupled to the communication unit. The processor receives, from the second device establishing the mesh network, an advertisement message including a first type field indicating a message transmitted from a device of the mesh network, accesses the mesh network based on the advertisement message, and transmits a control message including a parameter indicating a specific operation to the second device through the mesh network, wherein the control message includes at least one of an address of the first device, an address of the second device, a relay count value, or a second type field indicating a type of the control message.

Advantageous Effects

In accordance with the method for controlling a device using the Bluetooth BR/EDR and low energy (LE) technology according to an embodiment of the present invention, there is an effect in that a connection between other devices can be controlled through a control device.

Furthermore, the present invention has an effect in that data can be transmitted to a device in a remote place because Bluetooth devices transmit and receive data by forming a mesh network.

Furthermore, the present invention has an effect in that a device can discover a surrounding mesh network by defining the message format of a mesh network.

Furthermore, the present invention has an effect in that the address of a device attempting to transmit data can be known because the address of a device forming a mesh network is periodically transmitted to other devices.

Furthermore, the present invention has an effect in that whether another device has received data can be known because a device that forms a mesh network transmits data to another device within the network and receives a response thereto.

Technical objects to be achieved in this specification are not limited to the aforementioned objects, and those skilled in the art to which the present invention pertains may evidently understand other technological objects from the following description.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
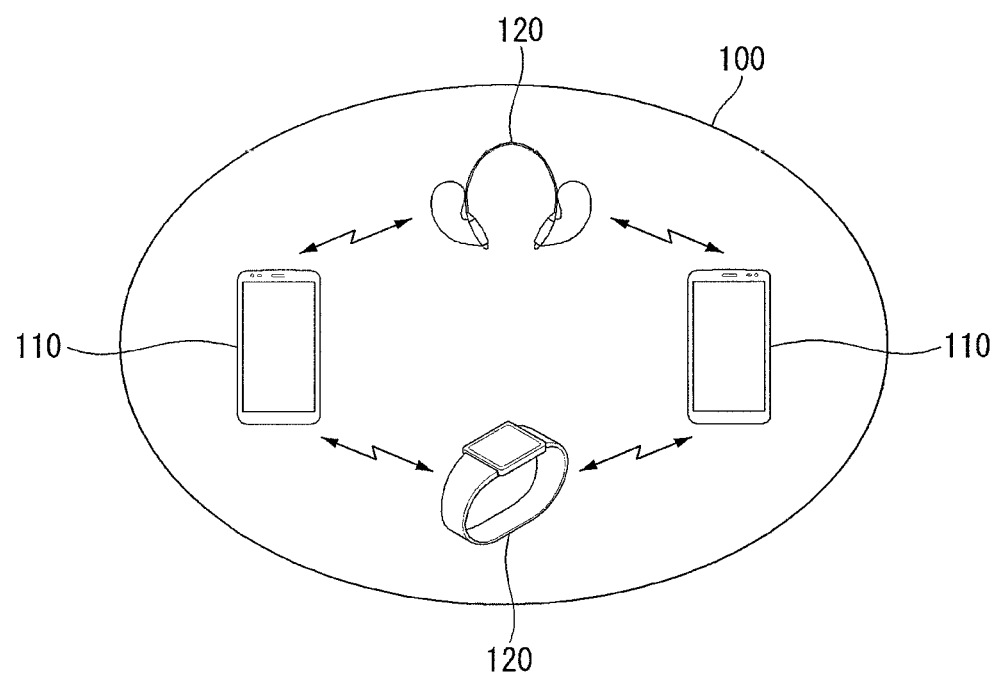
FIG. 1 is a schematic view illustrating an example of a wireless communication system using a Bluetooth low energy technology to which the present invention may be applied.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Furthermore, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Furthermore, in order to provide data information to the client device, the server device sends a notification message or an indication message to the client device in order to provide data information to the client device. Furthermore, the server device receives a confirmation message corresponding to the indication message from the client device.

Furthermore, in the process of transmitting and receiving the notification, indication, and confirmation messages to and from the client device, the server device may provide data information to a user through a display unit or may receive a request input from the user through a user input interface.

Furthermore, in the process of transmitting and receiving message to and from the client device, the server device may read data from a memory unit or may write new data to the corresponding memory unit.

Furthermore, the single server device may be connected with a plurality of client devices, and may be easily reconnected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Furthermore, in the process of transmitting and receiving messages with the server device, the client device may read data from a memory unit or may write new data to the corresponding memory unit.

Hardware components, such as the display units, the user input interfaces, and the memory units of the server device and the client device, will be described in detail with reference to FIG. 2.

Furthermore, the wireless communication system may configure personal area networking (PAN) through the Bluetooth technology. For example, in the wireless communication system, a private piconet may be established between devices to quickly and safely exchange files, documents, and the like.

Figure 2:
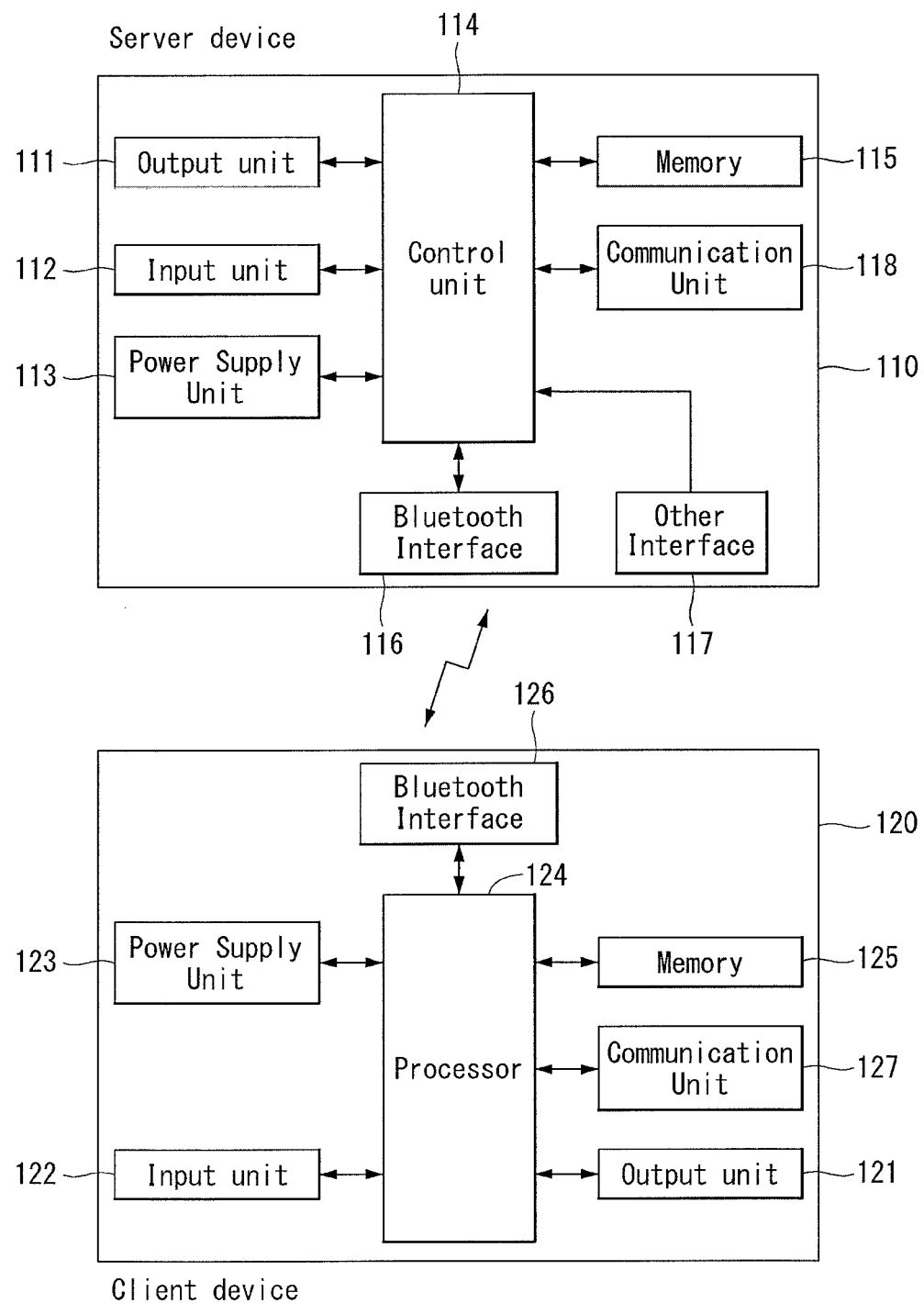
FIG. 2 is an internal block diagram of an example of devices to which the present invention may be applied.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Furthermore, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) capable of transmitting data, such as a request/response, a command, a notification and an indication/confirmation message between devices.

The memory units 115 and 126 are units implemented as various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be called a controller, a control unit or the like.

The processors 114 and 124 may include an application-specific integrated circuit (ASIC), other chip sets, logic circuits and/or data processing units.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Furthermore, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate, and thus, the power supply unit may supply power required for operations of the respective components even with small output power (10 mW (10 dBm) or less).

The user input interfaces 112 and 122 refer to modules providing a user input such as a screen button to the controllers to enable the user to control an operation of the devices.

Figure 3:
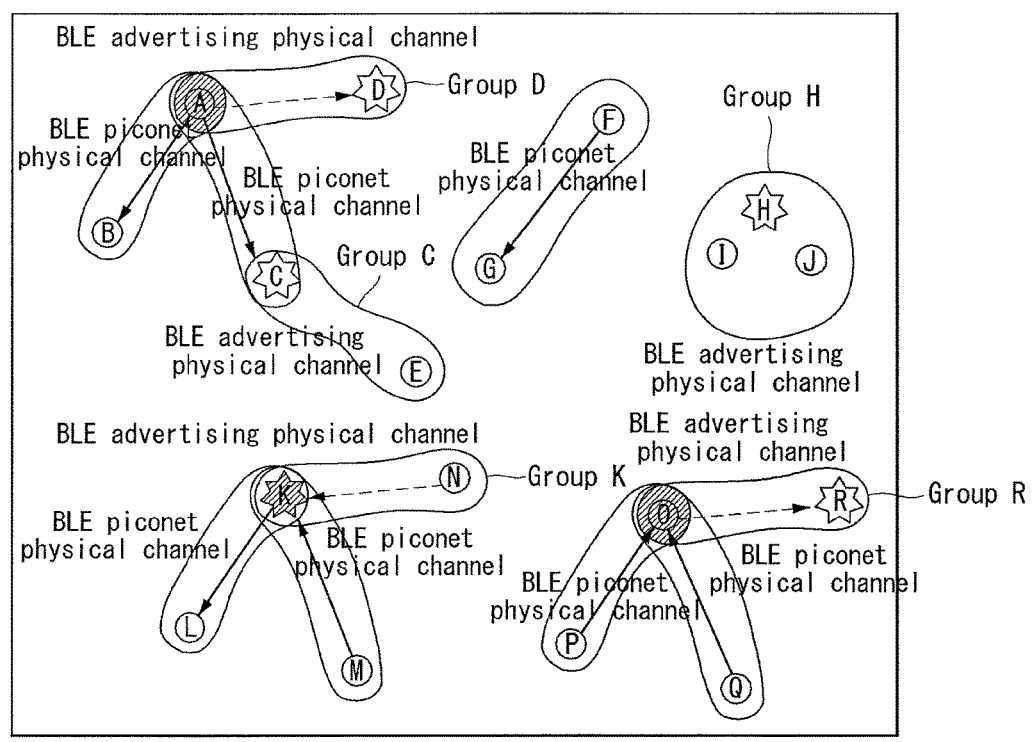
FIG. 3 is a view illustrating an example of a Bluetooth low energy topology.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

Figure 4:
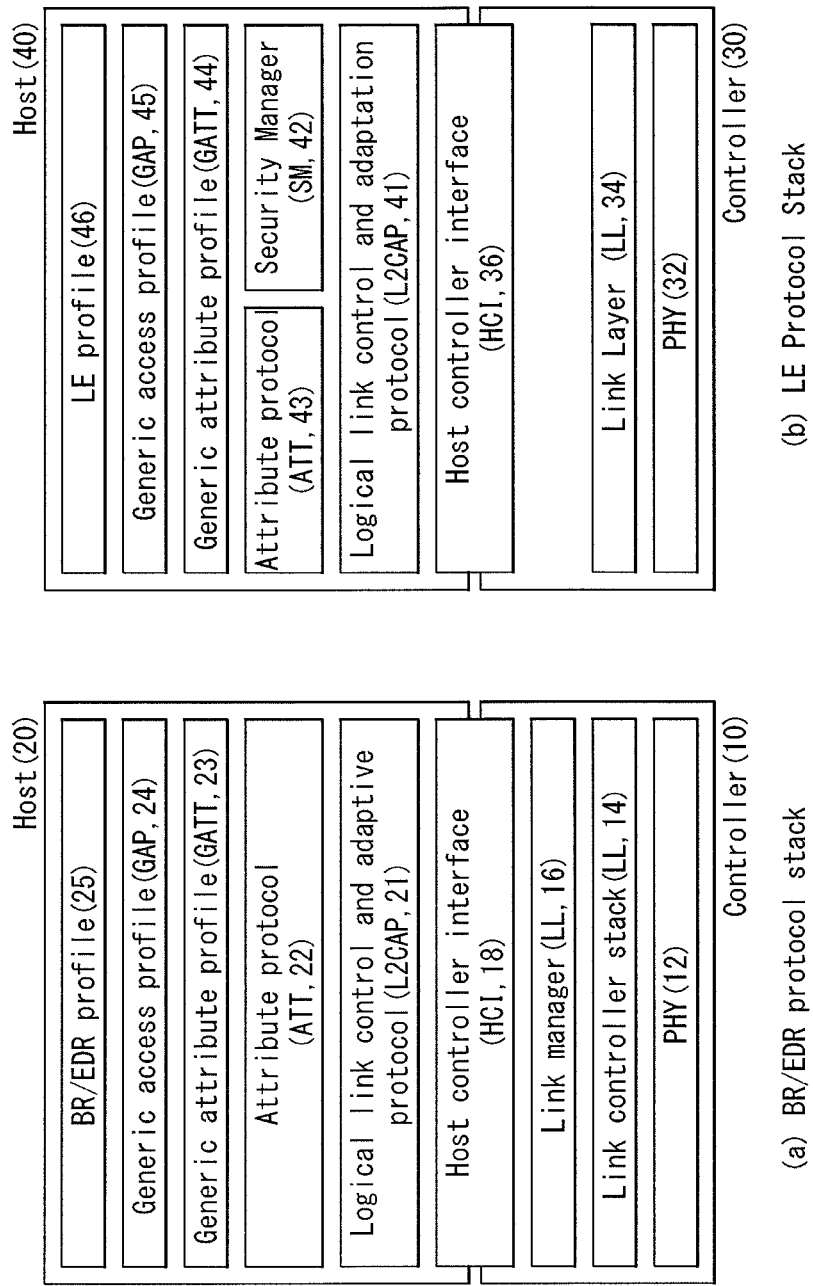
FIG. 4 is a view illustrating an example of a Bluetooth communication architecture to which the present invention may be applied.

FIG. 4 is a view illustrating an example of a Bluetooth communication architecture to which the present invention is applicable.

Referring to FIG. 4, FIG. 4A shows an example of a protocol stack of Basic Rate (BR)/Enhanced Data Rate (EDR), and FIG. 4B shows an example of a protocol stack of Bluetooth Low Energy (LE).

In detail, as illustrated in (a) of FIG. 3, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR Baseband layer 14 and a Link Manager layer 16.

The BR/EDR PHY layer 12 is the layer of transmitting and receiving a radio signals of 2.4 GHz, and may transmit data by hopping 79 RF channels in the case of using the Gaussian Frequency Shift Keying (GFSK) modulation.

The BR/EDR Baseband layer 14 plays the role of transmitting a Digital Signal, selects the channel sequence of hopping 1400 times per second, and transmits the time slot of 625 μs length for each channel.

The Link Manager layer 16 controls the entire operations (link setup, control and security) of a Bluetooth connection by utilizing the Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Furthermore, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a QUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method
② CD Time: Time information exchanging method
③ FindMe: Provision of alarm service according to distance
④ Proximity: Battery information exchanging method
⑤ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement, and is also called an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
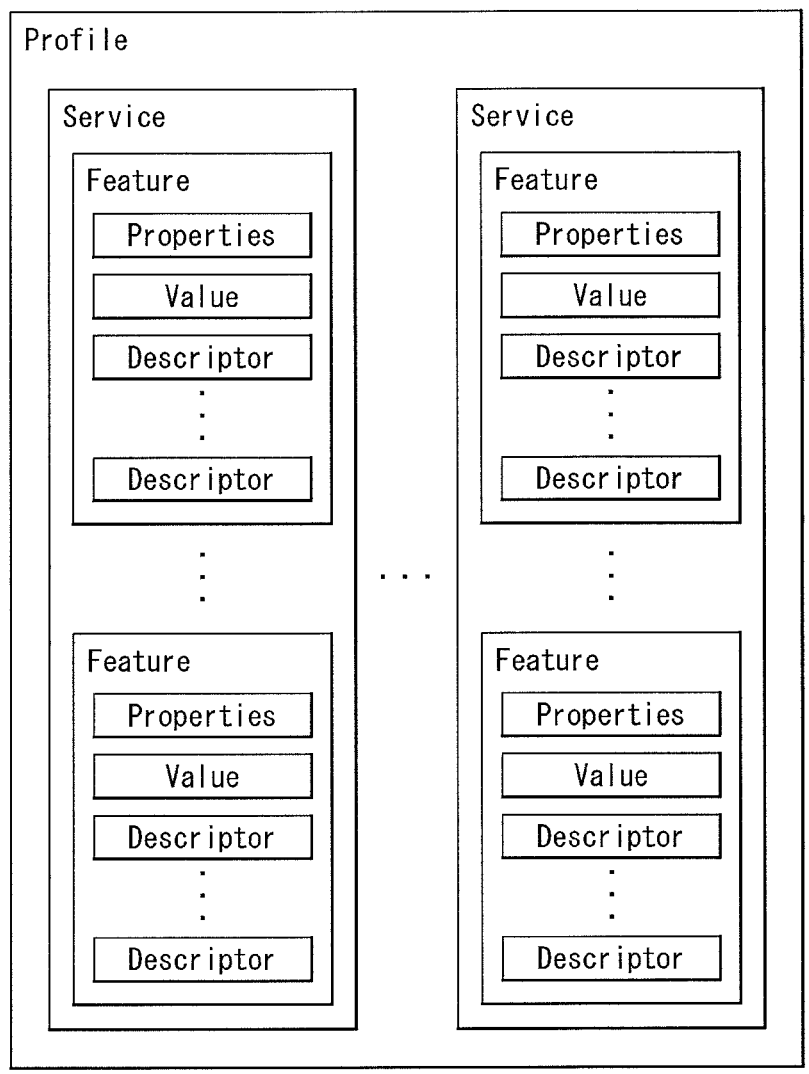
FIG. 5 is a view illustrating an example of a structure of a generic attribute profile (GATT) of Bluetooth low energy.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit QUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute However, Bluetooth LE has variations in link quality because of its wireless transfer feature, and may have shadow areas beyond a radio-wave range because of its one-to-one connectivity. To overcome these problems, a mesh network consisting of Bluetooth-equipped devices may be formed as a means of control via multi-hop links between devices.

A mesh network is described below.

Figure 6:
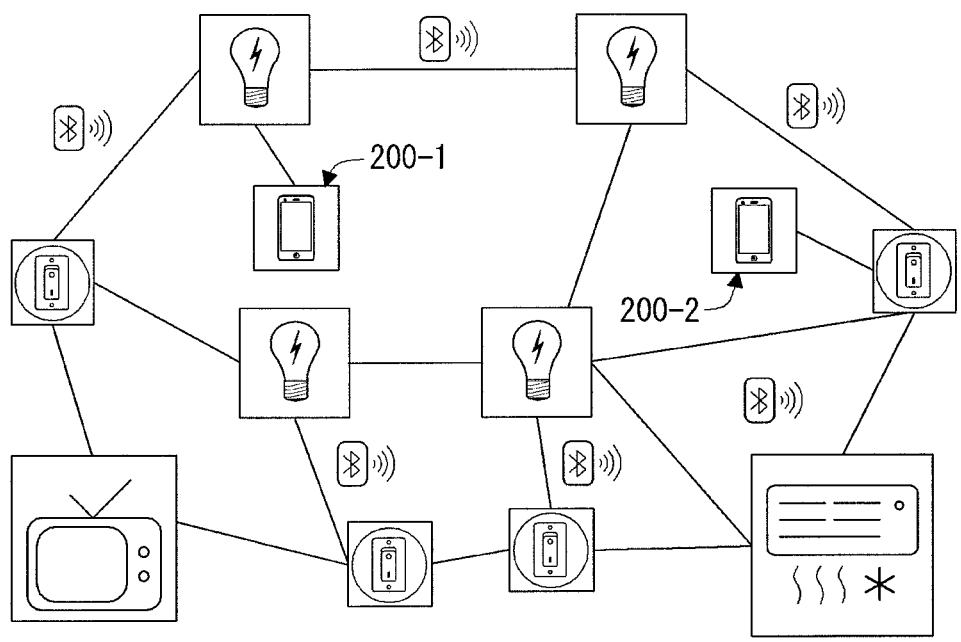
FIG. 6 is a schematic view illustrating an example of a Bluetooth mesh network to which the present invention may be applied.

FIG. 6 is a schematic diagram showing an example of a Bluetooth mesh network to which the present invention may be applied.

As shown in FIG. 6, a mesh network refers to a network in which a plurality of devices is interconnected like a net through Bluetooth and capable of transmitting and receiving data.

In the Bluetooth mesh network technology, several relay nodes that relay messages are present between a source device 200-1 that transmits data and a destination device 200-2 that receives data.

In this case, there may be a floating method and a routing method depending on operations of the relay nodes.

The floating method refers to a method in which relay nodes that receive a message shoot the message into the air using a characteristic that radio waves are spread into the air in all direction.

That is, the floating method refers to a method in which the source device 200-1 transmits a message to relay nodes through broadcast channels and the relay nodes that have received the message transmit the message to the destination device 200-2 by transmitting the message to adjacent relay nodes.

In the routing method, unlike in the floating method, the source device 200-1 transmits a message to a specific relay node. The specific relay node that has received the message transmits the message using information of another relay node or the destination node 200-2 to which the message will be transmitted again.

The routing method has an advantage in that it can reduce more radio resources than the floating method, but has disadvantages in that complexity is increased in its implementation and path information must be exchanged between relay nodes in order to construct a routing table indicative of relay nodes to which a message will be transmitted.

In a Bluetooth mesh network, a device may be divided into an edge node and a relay node depending on its role.

In general, the edge node is supplied with power through a battery and is present in a sleep state at normal times and may wake up through an interaction or periodically.

The edge node may process a received message when the following conditions are satisfied.

When a message is not present in a cache.
When a message is authenticated by a known network key.
When the destination of a message is the unicast address of the edge node or a broadcast address or group address is an address to which the edge node belongs.

In order to maintain network quality, it is preferred that the relay node always wakes up in order to perform a relay operation of receiving the message (e.g., data) of other nodes and transferring them to other nodes. Accordingly, in general, the relay node may be a device supplied with main power.

The relay node may retransmit a received message to another node when the following conditions are satisfied.

When a message is not present in a cache.
When a message is authenticated by a known network key.
When a field (e.g., a relay number value) indicating whether a message will be relayed is a value that permits the relay.
When a destination address is a unicast address assigned to the relay node.

However, there are problems in that in the Bluetooth mesh network, a new device cannot be aware of whether the mesh network is present nearby when it attempts to join the mesh network and the new device is accurately unaware of the address of a destination device when it attempts to transmit a message to the destination device.

Furthermore, there is a problem in that there is no method of checking whether a message transmitted to a destination device has been properly transmitted.

Accordingly, in order to solve the problems, the present invention proposes a method of defining a new message type for enabling a new device to identify a mesh network and transmitting the address of a destination device and a method of receiving a response to a transmitted message.

Figure 7:
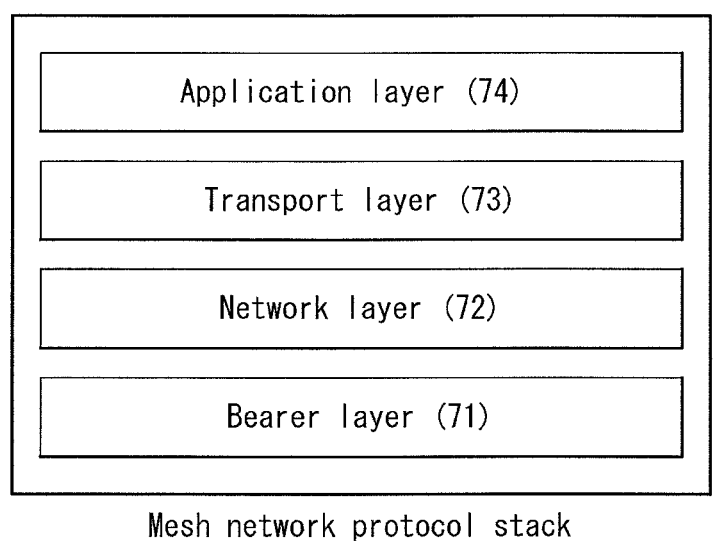
FIG. 7 is a diagram showing an example of the protocol stack of a Bluetooth mesh network to which the present invention may be applied.

FIG. 7 is a diagram showing an example of the protocol stack of a Bluetooth mesh network to which the present invention may be applied.

Referring to FIG. 7, the protocol stack of the mesh network includes a bearer layer 71, a network layer 72, a transport layer 73 and an application layer 74.

The bearer layer 71 defines a method in which a message is transmitted between nodes. That is, in the mesh network, the bearer layer determines a bearer to which a message is transmitted.

An advertising bearer and a GATT bearer for message transmission are present in the mesh network.

The network layer 72 defines a method of transferring a message to one or more nodes in the mesh network. The network layer 72 defines the format of messages transmitted by the bearer layer 71.

The transport layer 73 defines the encryption and authentication of a message. The application layer 74 defines how the transport layer 73 is used in a higher layer.

Figure 8:
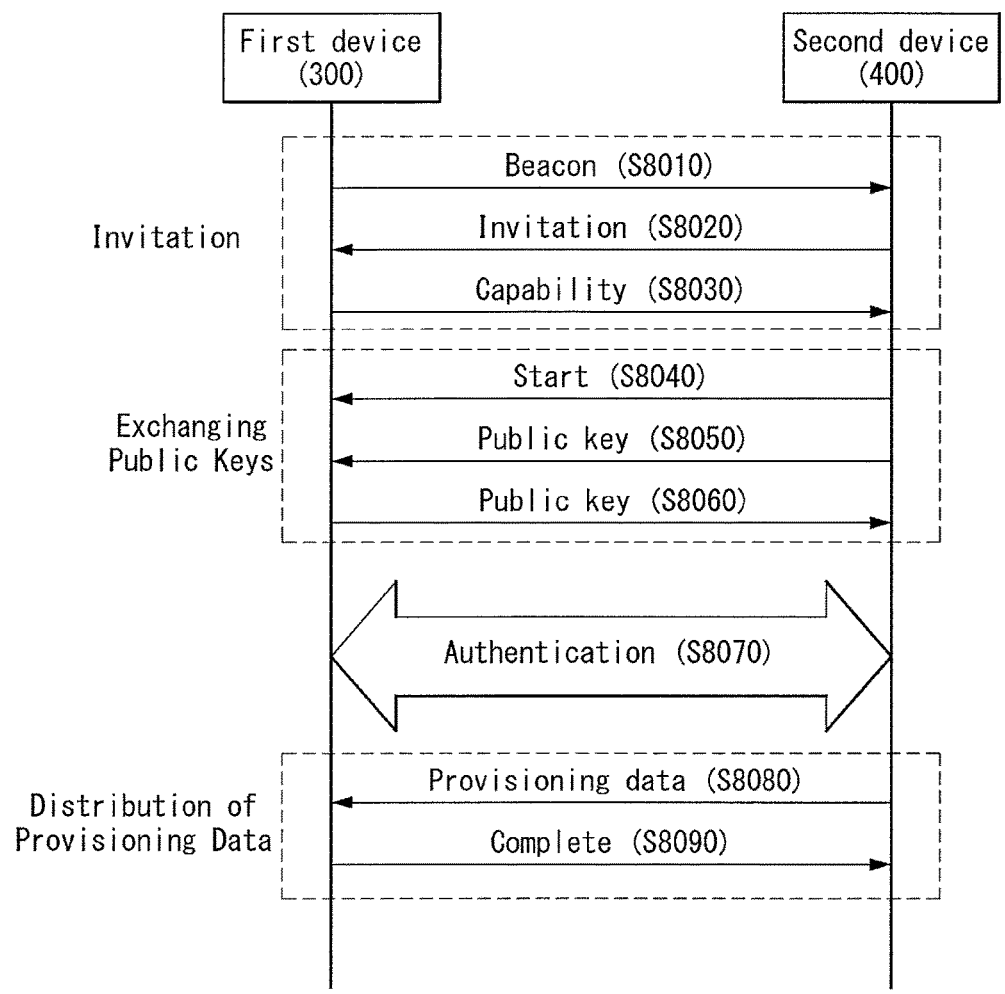
FIG. 8 is a flowchart illustrating an example of a method for a device to join a Bluetooth mesh network to which the present invention may be applied.

FIG. 8 is a flowchart illustrating an example of a method for a device to join a Bluetooth mesh network to which the present invention may be applied.

A new device (first device 300) has to experience a provisioning procedure in order to join a mesh network. The provisioning procedure is a procedure in which a device (second device 400) in the provisioning state in the mesh network provides information for joining the mesh network. The first device 300 may obtain the address of the mesh network, keys, a device identifier and various types of information for operating as part of the mesh network through the provisioning procedure.

The provisioning procedure includes an invitation step, an exchanging public key step, an authentication step and a distribution of provisioning data step.

Invitation Step

The invitation step starts when the second device 400 scans the first device 300. The first device transmits a beacon message to the second device 400 (S8010). The beacon message includes the UUID of the first device 300.

The second device 400 that has scanned the first device 300 through the beacon message transmits an invitation message to the first device 300 (S8020).

The invite message inquires about whether the first device 300 will performs a provisioning procedure. If the first device 300 does not want to perform the provisioning procedure, it neglects the invite message.

However, if the first device 300 wants to perform the provisioning procedure, that is, if the first device 300 wants to join the mesh network, the first device 300 transmits a capability message as a response thereto (S8030).

The capability message may include information indicating whether the first device 300 supports the setting of a security algorithm, a public key, information indicating whether the first device 300 can output a value to a user, and information indicating whether the first device 300 can receive a value from a user.

Exchanging Public Key Step

Thereafter, the second device 400 transmits a start message for the start of provisioning to the first device 300 (S8040).

If a public key cannot be used using an out-of-band technology, the second device 400 and the first device 300 exchange public keys (S8050, S8060).

If a public key can be used through an out-of-band mechanism, however, the second device 400 may transmit an ephemeral public key to the first device 300 and read a static public key from the first device 300 of the out-of-band technology.

Thereafter, the second device 400 authenticates the first device 300 by performing an authentication procedure along with the first device 300 (S8070).

Distribution of Provisioning Data Step

When the first device 300 is authenticated, the second device 400 and the first device 300 generate a session key through calculation.

Thereafter, the second device 400 transmits provisioning data to the first device 300 (S8080).

The provisioning data may include an application key, a device key, a network key, IVindex, and a unicast address.

The first device 300 that has received the provisioning data transmits a complete message as a response thereto, so the provisioning procedure is terminated (S8090).

Figure 9:
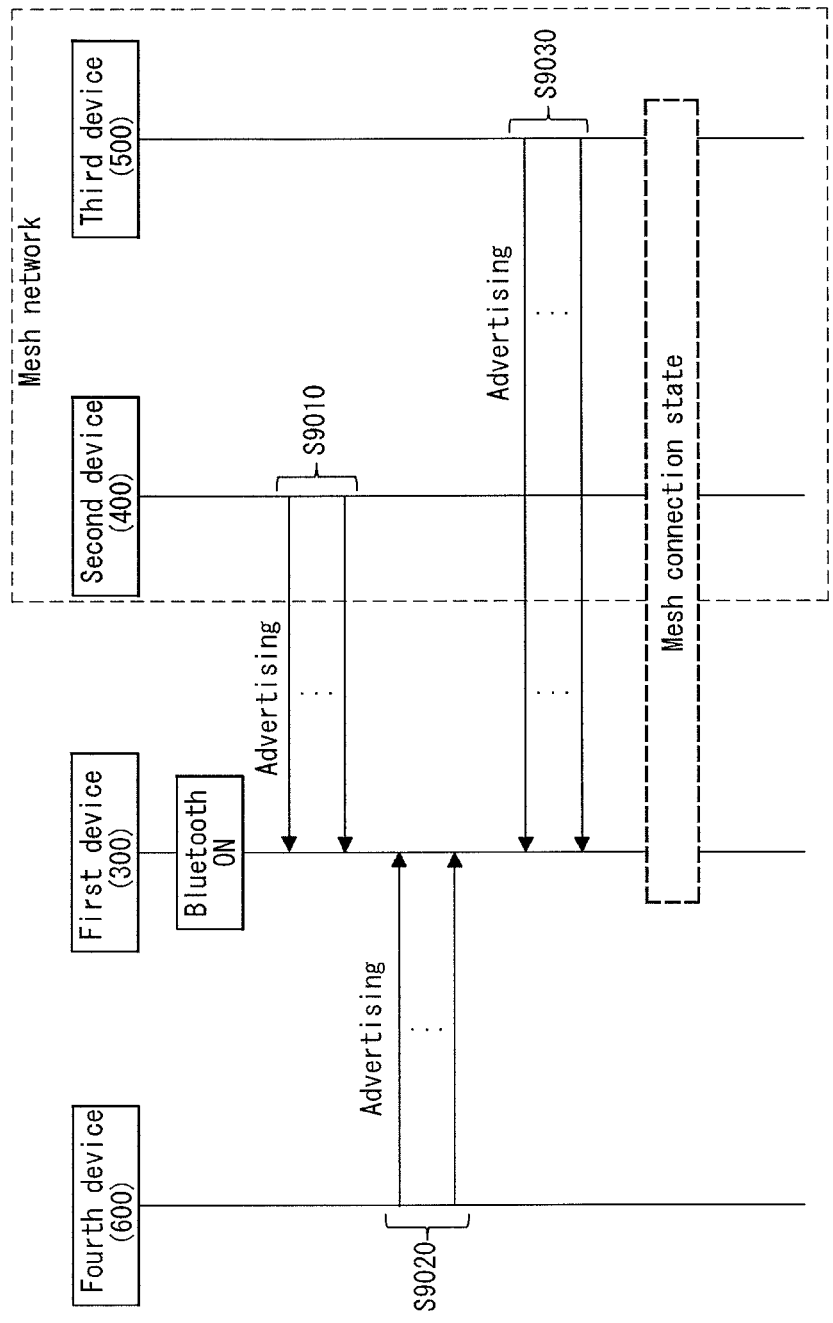
FIGS. 9 and 10 show examples of a method and data format for a device to discover a Bluetooth mesh network to which the present invention may be applied.
Figure 10:
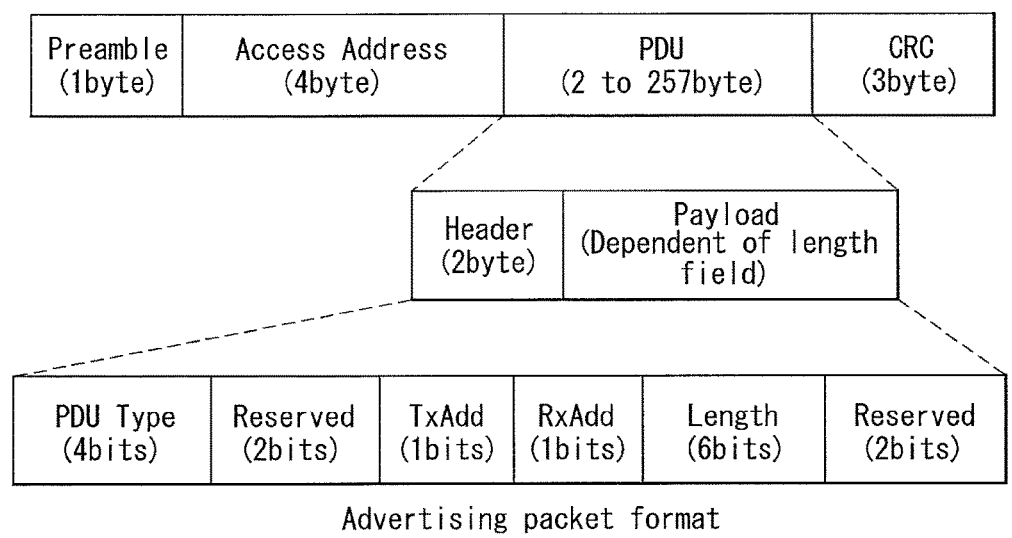

FIGS. 9 and 10 show examples of a method and data format for a device to discover a Bluetooth mesh network to which the present invention may be applied.

Referring to FIGS. 9 and 10, if a device discovers a surrounding Bluetooth device, it may differently discover a device that forms a mesh network and a device that does not form a mesh network.

First, a second device 400 and a third device 500 have already formed a mesh network, and a fourth device 600 has not formed the mesh network.

When a first device 300 turns on a Bluetooth function for a Bluetooth connection, it may receive an advertising message from adjacent devices and discover adjacent devices.

The second device 400 that forms the mesh network transmits an advertising message to the first device 300 in order to notify the first device 300 of the presence of the second device 400 belonging to the mesh network (S9010).

The expression of the advertising message is one example and may be called various expression, such as an advertisement message, an advertising PDU or an advertising packet.

In this case, the second device 400 may periodically transmit the advertising message through three advertising channels.

The advertising message transmitted by the second device 400 may have the following format of FIG. 10.

Table 2 shows an example of the PDU Type of the advertising message.

TABLE 2

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111 | ADV_MESH |
| 1000 | ADV_MESH_PRESENCE |
| 1001 | ADV_MESH_COMMAND |

TABLE 2-continued

| PDU Type | Packet Name |
|---|---|
| 1010 | ADV_MESH_COMMAND_ACK |
| 1011-1111 | Reserved |

In Table 2, the PDU Type used in the mesh network is as follows.

ADV_MESH: an advertising type used for a new device to discover a mesh network when it joins the mesh network.

ADV_MESH_PRESENCE: an advertising type used for a device to notify other devices within a mesh network of its own address in the mesh network.

ADV_MESH_COMMANC: an advertising type for control between devices forming a mesh network.

ADV_MESH_COMMANC_ACK: an advertising type for providing notification of the results of the execution of a command in a mesh network.

The PDU Type (first type field) of the advertising message transmitted by the second device 400 may have the value "0111" in Table 2.

The first device 300 that has received the advertising message may be aware that the mesh network has been formed and the second device 400 forms the mesh network.

The fourth device 600 also transmits an advertising message to the first device 300 through an advertising channel in order to notify the first device 300 of its own presence (S9020). In this case, the PDU type of the advertising message transmitted by the fourth device 600 may have one of the values "0000", "0001", "0010" and "0110" in Table 2.

The first device 300 may discover the fourth device 600 by receiving the advertising message transmitted by the fourth device 600, and may be aware that the fourth device 600 has not formed a mesh network.

Thereafter, the third device 500 also may transmit an advertising message having a PDU Type of "ADV_MESH" to the first device 300 through an advertising channel (S9030).

The first device 300 that has received the advertising message may be aware that the third device 500 has formed the mesh network along with the second device 400.

If the first device 300 wants to join the mesh network of the second device 400 and the third device 500, it may join the mesh network by performing the provisioning procedure, described with reference to FIG. 8, along with the second device 400 or the third device 500.

Through such a method, the first device 300 can differently discover a device that forms a mesh network and a device that does not form a mesh network, and may join a discovered mesh network.

Figure 11:
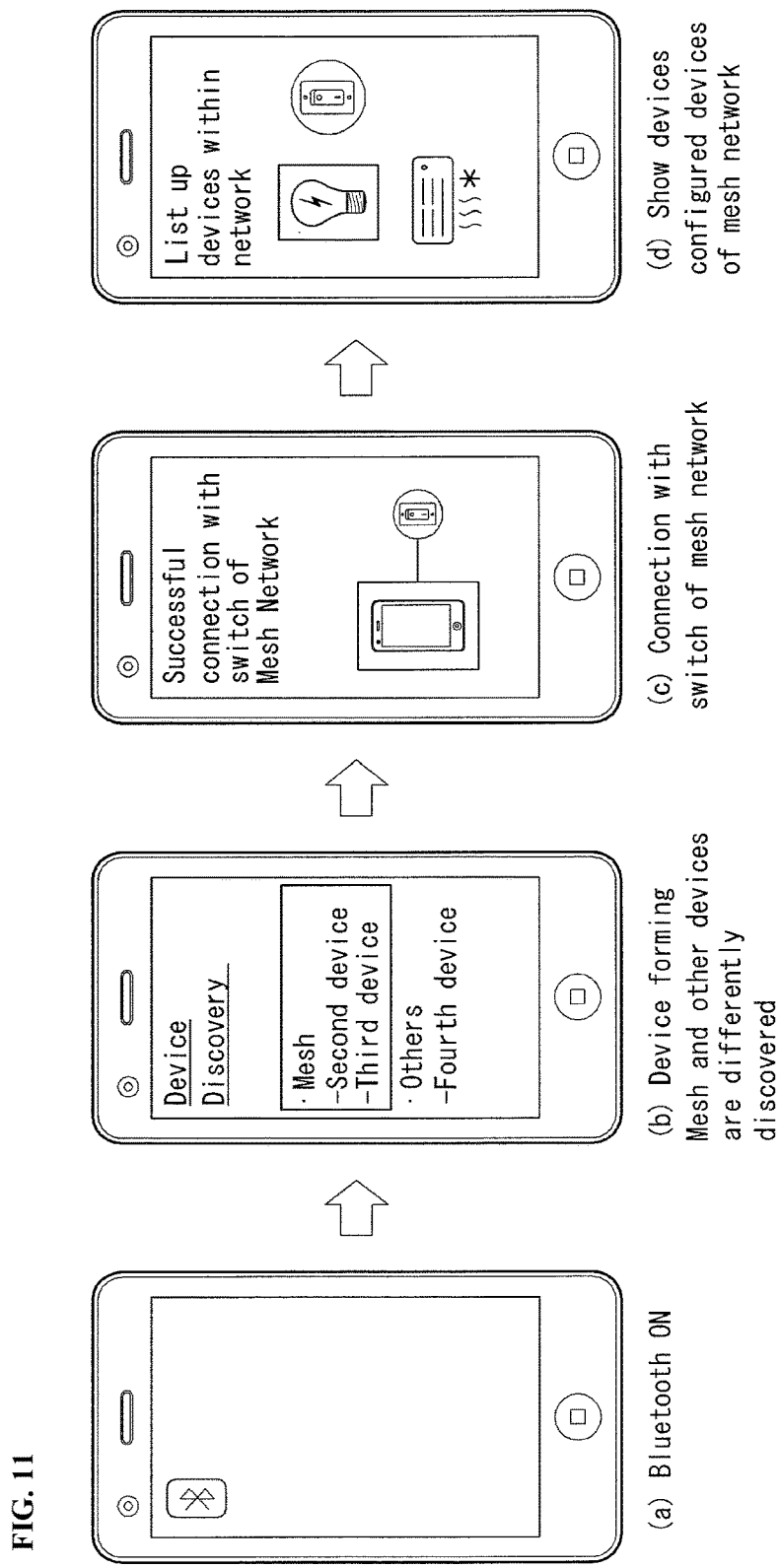
FIG. 11 is a diagram showing an example of a user interface (UI) through which a device discovers a Bluetooth mesh network to which the present invention may be applied.

FIG. 11 is a diagram showing an example of a user interface (UI) through which a device discovers a Bluetooth mesh network to which the present invention may be applied.

Referring to FIG. 11, when a device discover Bluetooth devices through the method described with reference to FIGS. 10 and 11, it may differently output devices that form a mesh network and devices that do not form a mesh network.

Specifically, (a) when the first device 300 discovers Bluetooth devices and turns on a Bluetooth function for a connection, it may discover Bluetooth devices through advertising messages transmitted by surrounding devices.

(b) As described with reference to FIGS. 10 and 11, advertising messages transmitted by devices that form a mesh network have PDU Types different from those of advertising messages transmitted by devices that do not form a mesh network.

Accordingly, a device can differently discover the second device 400 and third device 500 that form the mesh network and the fourth device 600 that does not form the mesh network.

The device may differently output discovered devices by classifying them into the second device 400 and third device 500 that form the mesh network and the fourth device 600 that does not form the mesh network.

(c) Thereafter, if the first device 300 wants to join the mesh network, it may join the mesh network through the provisioning procedure, described with reference to FIG. 8, along with the second device 400 or the third device 500.

(d) When the first device 300 joins the mesh network, it may output devices that currently form the mesh network.

Accordingly, a user can control the operations of the outputted devices.

Figure 12:
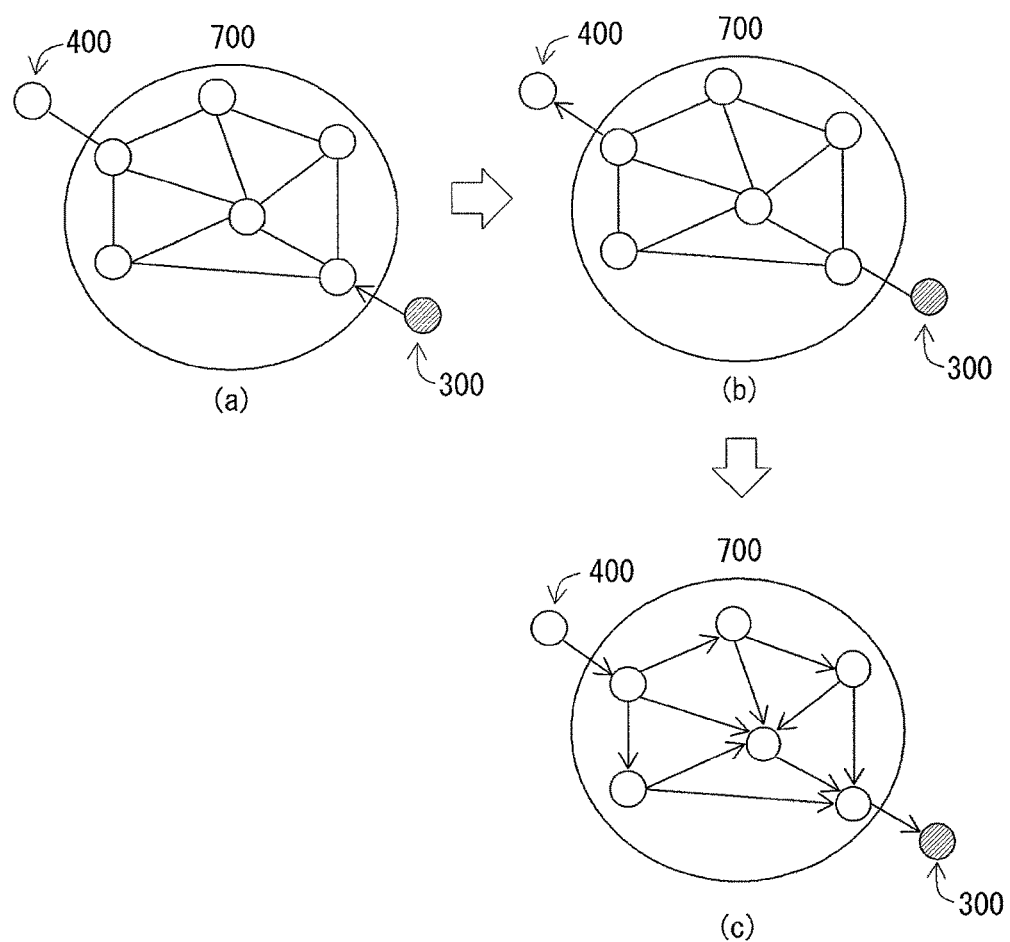
FIGS. 12 to 14 are schematic diagrams showing examples of a method and data format for transmitting the address of a device in a Bluetooth mesh network to which the present invention may be applied.
Figure 13:
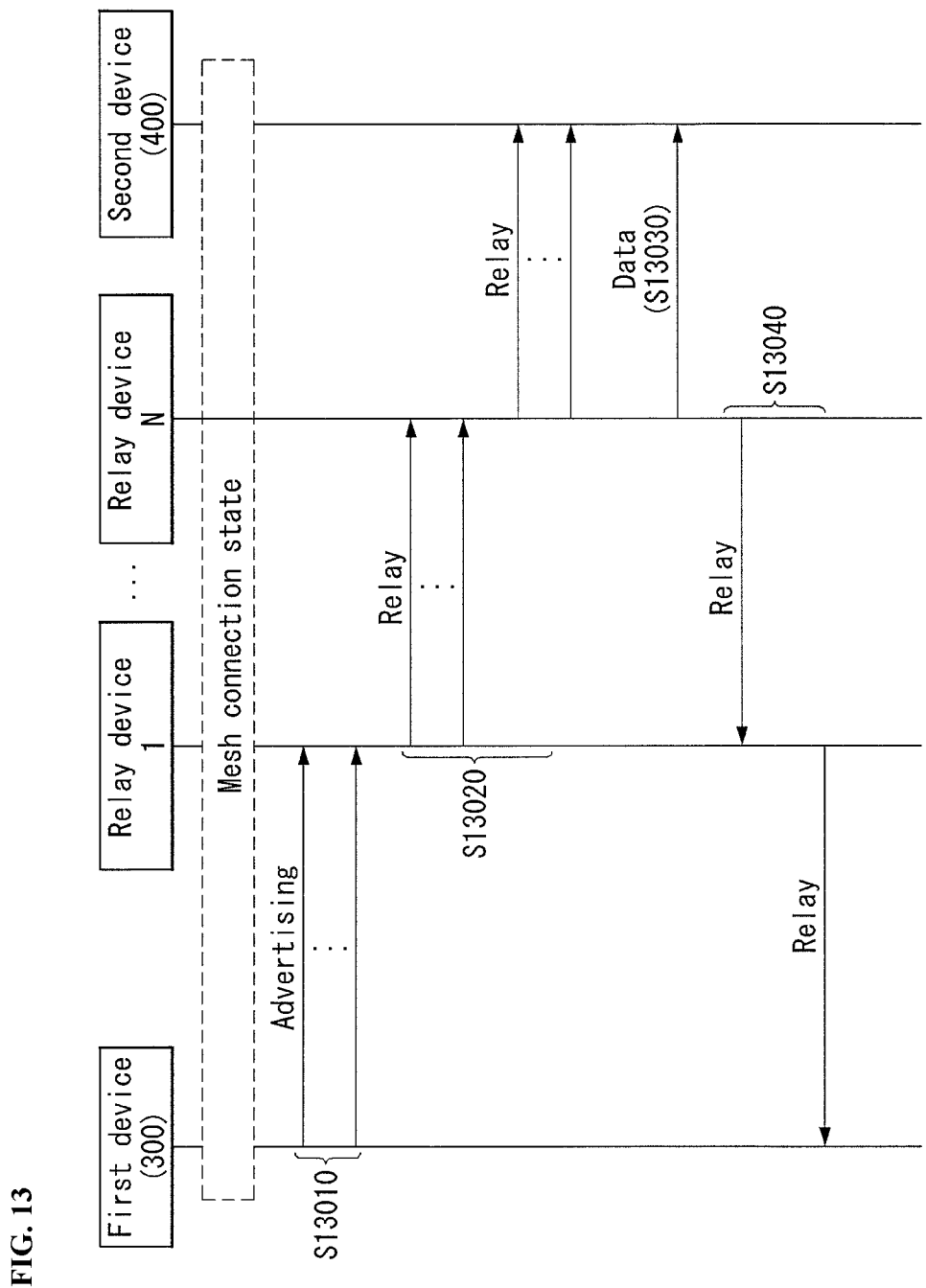
Figure 14:
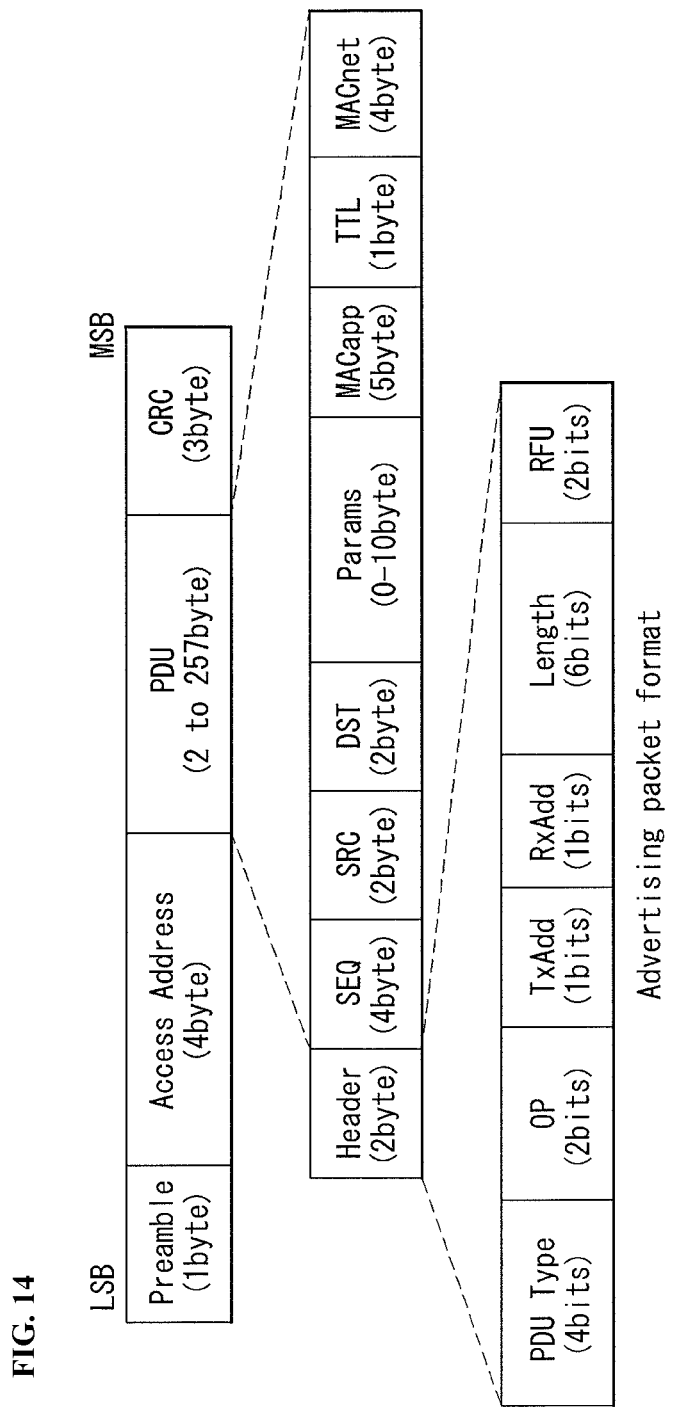

FIGS. 12 to 14 are schematic diagrams showing examples of a method and data format for transmitting the address of a device in a Bluetooth mesh network to which the present invention may be applied.

Referring to FIGS. 12 to 14, a device that forms a mesh network may periodically transmit its own address to devices within the mesh network through an advertising message, may check the address of a destination device through the advertising message, and may transmit data.

FIG. 12 shows a schematic diagram of a method of providing notification of other devices within the network of its own address.

It is assumed that a first device 300 and a second device 400 form a mesh network.

(a) The first device 300 forming the mesh network periodically broadcasts an advertising message, including its own address, to other devices within the mesh network through an advertising channel.

(b) If the second device 400 is located at a long distance from the first device 300 or not adjacent to the first device 300, it may receive the advertising message of the first device 300 through the relay operation of one or more relay devices 700 located in the middle.

The relay operation means an operation of retransmitting a message, received by the one or more relay devices 700 in the middle, to another adjacent device.

The second device 400 may check the presence of the first device 300 and the address of the first device 300 through the advertising message.

(c) Thereafter, if the second device 400 has data to be transmitted to the first device 300, it may set the address of the first device 300 as a destination address, and may transit the data to the first device 300 using the floating method through the relay operation of the one or more relay nodes in the middle.

FIG. 13 shows a detailed flowchart of the method described in FIG. 12.

First, the first device 300, the one or more relay devices 700 and the second device 400 form a mesh network as in FIG. 12.

The first device 300 transmits an advertising message to other devices (the one or more relay devices 700 and the second device 400) within the mesh network through the advertising channel in order to notify them of its own presence and address (S13010).

The expression of the advertising message is one example and may be called various expression, such as an advertisement message, an advertising PDU and an advertising packet.

The advertising message may be periodically transmitted and may have a format, such as that of FIG. 14.

Fields shown in FIG. 14 are as follows.

SEQ (sequence number): indicate a number providing notification of the sequence of a packet.

SRC (Source Address): indicate the address of a source device.

DST (Destination Address): indicate the address of a destination device.

OP (Operation Code): it is operation code and a field indicating whether a message is for what, and may have a value shown in Table 3 depending on the type of message.

TABLE 3

| Opcode | Message Type |
| --- | --- |
| 01 | Mesh |
| 01 | Presence |
| 10 | Command |
| 11 | Command_ACK |

In FIG. 13, the Opcode field of the advertising message transmitted by the first device 300 may have the value "01."

Params: it is a field including the data of a packet, and may include a parameter value (e.g., a parameter indicative of a specific operation).

TID (Transaction Identifier): indicates an ID used to transmit and receive a message.

MACapp (Message Authentication Code, the first authentication code): it is a value for the authentication of the Op field and the Params field, and the values of the OP field and Params field are indicated as Hash values.

TTL (Time To Live): it is a value indicating whether a message will be relayed or not, and may indicate a relay number value.

A relay operation may be performed as follows depending on a TTL value.

0=a message is not relayed
1=a relay operation is stopped
1 or higher=a message is retransmitted to an adjacent device again If the TTL value is 1 or higher, the TTL value may be decreased by 1 whenever a relay operation is once performed, that is, whenever a message is retransmitted.

MACnet (Message Authentication Code, second authentication code): it is authentication code for the authentication of the entire message and defends the attack of a message from another network.

The one or more relay devices that have receive the advertising message check the value of the "TTL" field of the advertising message, and retransmit the advertising message to another adjacent device through a relay operation if the value is greater than "1." (S13020).

The second device 400 that has received the advertising message can be aware of the presence of the first device 300 and the address of the first device 300.

Thereafter, if the second device 400 has data to be transmitted to the first device 300, it includes the address of the first device 300 in the "DST" field and transmits it to the one or more relay devices (S13030).

The one or more relay devices 700 that has received the data check the TTL value of the data, and retransmit the data to an adjacent device through a relay operation if the TTL value is greater than 1 (S13040).

The first device 300 may receive the data through the relay operation of the one or more relay devices 700, and may be aware whether the data is data transmitted thereto through the "DST" field of the received data.

Through such a method, devices within a mesh network can check the presence and addresses of other devices through the advertising messages of other devices that are periodically transmitted, and may transmit a message to a correct device when they transmit the message.

Furthermore, the device that has received the message can check whether the received message is a message transmitted thereto.

Figure 15:
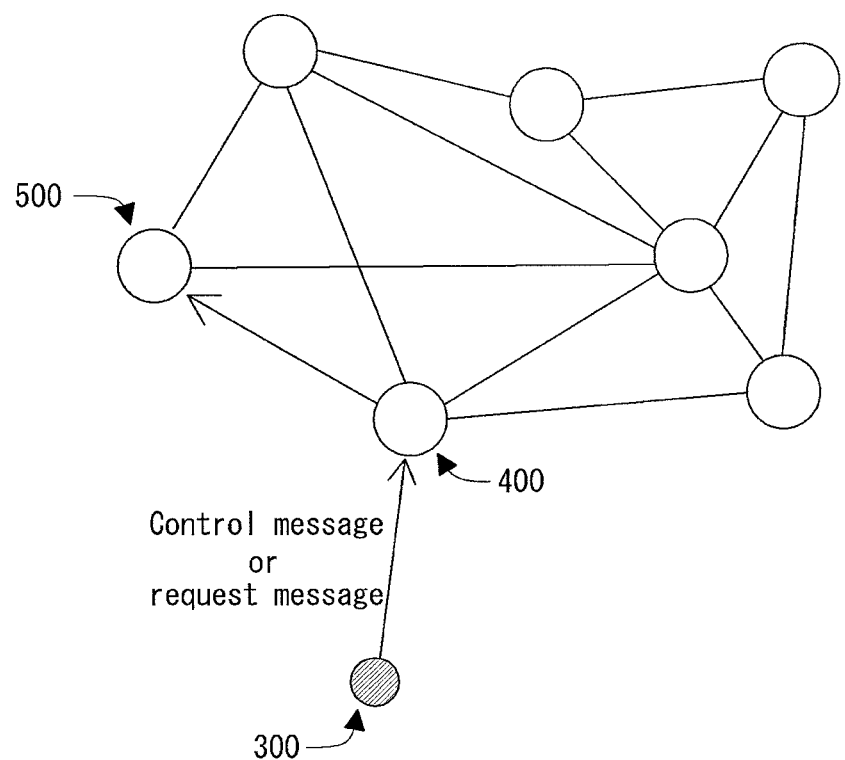
FIG. 15 is a schematic diagram showing an example of a method for transmitting data in a Bluetooth mesh network to which the present invention may be applied.

FIG. 15 is a schematic diagram showing an example of a method for transmitting data in a Bluetooth mesh network to which the present invention may be applied.

Referring to FIG. 15, another device within a mesh network may be instructed or requested to perform a specific operation through a control message or the request message within the mesh network. If whether another device performs the specific operation is to be checked, it may be checked through a response message.

Specifically, a first device 300 that forms a mesh network transmits a control message or request message for controlling or requesting a specific operation (e.g., a bulb is off if the third device is a bulb) from a third device 500 within the mesh network to a second device 400.

The second device 400 checks the destination address of the control message or the request message, and retransmits the control message or the request message to an adjacent device if the control message or the request message is not a message transmitted thereto.

The third device 500 that has received the control message or the request message from the second device 400 may check that the control message or the request message is a message transmitted thereto by checking the destination address.

Thereafter, the third device 500 may perform the specific operation indicated through the control message or the request message.

If a response to the control message or the request message is not necessary (e.g., if the user of the first device cannot check whether the third device has performed the specific operation or does not need to check whether the third device has performed the specific operation), the third device 500 does not transmit a corresponding response to the first device 300.

If a response to the control message or the request message is necessary (e.g., if the user of the first device cannot check whether the third device has performed the specific operation), however, the third device 500 may notify the first device 300 whether it has performed the specific operation by transmitting a corresponding response to the first device 300.

Through such a method, a specific operation can be indicated for another device within a mesh network, and whether a specific operation has been performed can be checked.

Figure 16:
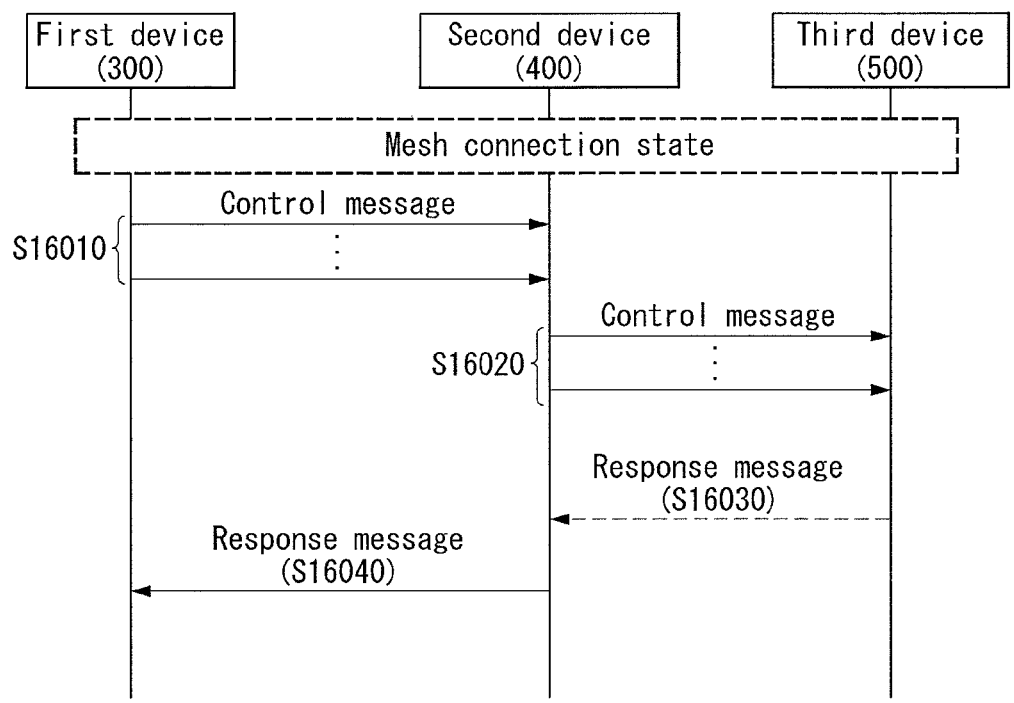
FIG. 16 is a flowchart illustrating an example of a method for transmitting data in a Bluetooth mesh network to which the present invention may be applied.

FIG. 16 is a flowchart illustrating an example of a method for transmitting data in a Bluetooth mesh network to which the present invention may be applied.

Referring to FIG. 16, a device within a mesh network may instruct another device to perform a specific operation through a control message (e.g., an advertising message), and may transmit a response message depending on the type of control message.

First, it is assumed that a first device 300, a second device 400 and a third device 500 have formed a mesh network.

If the first device 300 wants to control the third device 500 so that the third device performs a specific operation, the first device 300 transmits a control message (e.g., an advertising message) that instructs the specific operation to the adjacent second device 400 through an advertising channel (S16010).

The expression of the control message is one example and may be called various expressions, such as an advertising message, an advertisement message, an advertising PDU and an advertising packet.

In this case, the control message may have a format, such as that of FIG. 14. The PDU Type of the control message may be any one of "ADV_MESH_COMMAND_ACK" and "ADV_MESH_COMMAND" of Table 2. An OP field may be a value indicative of one of "Command" and "Command_ACK."

Furthermore, a destination address is set as the address of the third device.

The second device 400 that has received the control message checks that the destination address has been set as the address of the third device 400, and retransmits the control message to an adjacent device through a relay operation (S16020).

The third device 500 that has received the control message retransmitted by the second device through the relay operation checks that the destination address is its own address, and may perform the specific operation instructed through the control message.

If the PDU Type of the control message is "ADV_MESH_COMMAND" and/or the value of the OP field is a value indicative of "Command", the third device 500 does not transmit a response message for the control message.

If the PDU Type of the control message is "ADV_MESH_COMMAND_ACK" and/or the value of the OP field is a value indicative of "Command_ACK", however, the third device 500 transmits a response message for the control message to the second device 400 (S16030). The second device 400 retransmits the response message to the first device 300 (S16040).

The expression of the response message is one example and may be called various expressions, such as ACK.

The first device 300 may be aware of whether the third device 500 has performed the specific operation through the response message.

Through such a method, the first device 300 can instruct the third device 500 within the mesh network to perform the specific operation through the control message, and can check whether the third device 500 has normally performed the specific operation through the response message. For example, if the third device 500 has not performed the specific operation, it may notify the first device 300 that it has not performed by including a reason thereof in the response message and transmitting the response message.

Figure 17:
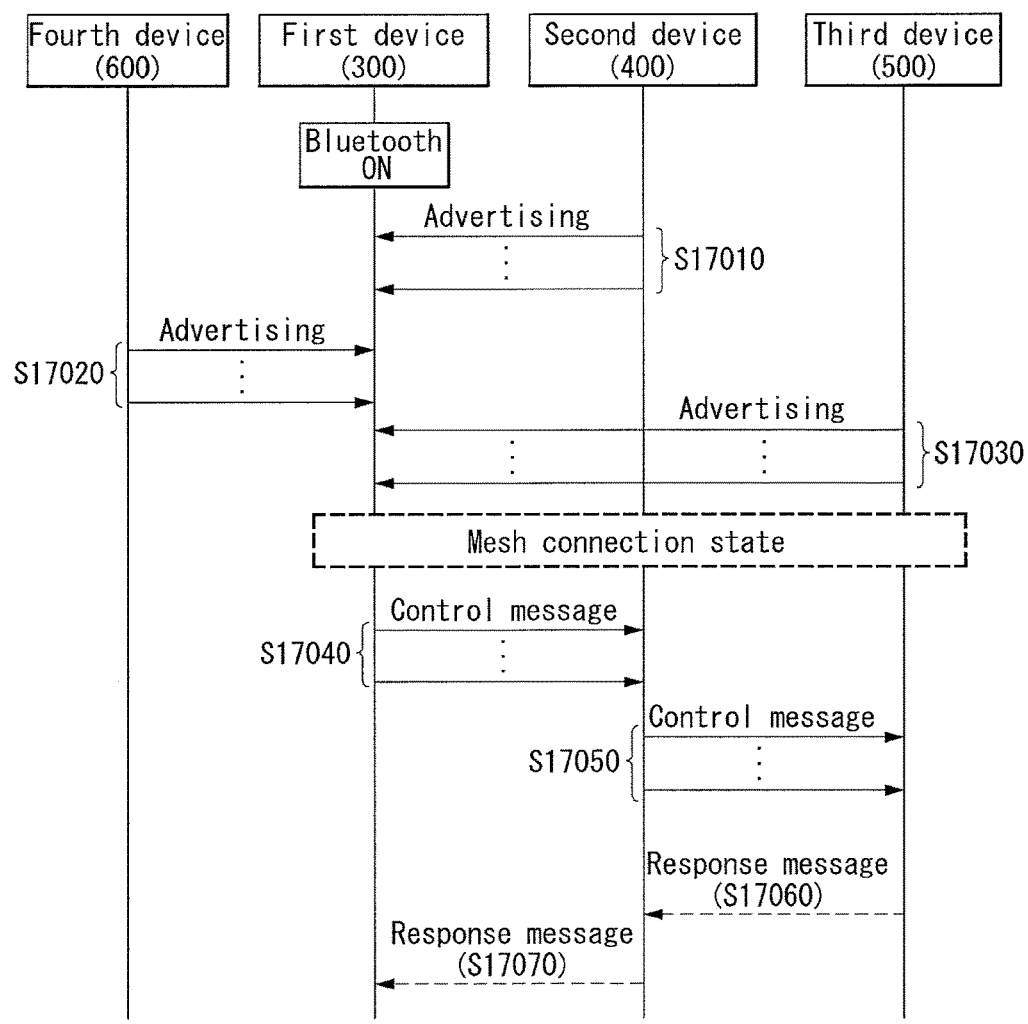
FIG. 17 is a flowchart illustrating another example of a method for transmitting data in a Bluetooth mesh network to which the present invention may be applied.

FIG. 17 is a flowchart illustrating another example of a method for transmitting data in a Bluetooth mesh network to which the present invention may be applied.

Referring to FIG. 17, a device that does not form a mesh network may discover the mesh network, may join the mesh network, and may instruct another device to perform a specific operation over the formed mesh network.

First, step S17010 to step S17030 are the same as step S9010 to step S9030 of FIG. 9, and a description thereof is omitted.

Thereafter, if the first device 300 wants to control the third device 500 so that the third device performs a specific operation, the first device 300 transmits a control message that instructs the specific operation to the adjacent second device 400 through an advertising channel (S17040).

The expression of the control message is one example and may be called various expressions, such as an advertising message, an advertisement message, an advertising PDU and an advertising packet.

In this case, the OP field (second type field) of the advertising message may be a value indicative of one of "Command" and "Command_ACK", and a destination address is set as the address of the third device.

The second device 400 that has received the advertising message checks that the destination address has been set as the address of the third device 400 and retransmits the advertising message to an adjacent device through a relay operation (S17050).

The third device 500 that has received the control message retransmitted by the second device through the relay operation checks that the destination address is its own address, and may perform the specific operation instructed through the control message.

If the value of the OP field of the control message is a value indicative of "Command", the third device 500 does not transmit a response message for the control message.

The expression of the response message is one example and may be called various expressions, such as ACK.

If the value of the OP field is a value indicative of "Command_ACK", however, the third device 500 transmits a response message for the control message to the second device 400 (S17060). The second device 400 retransmits the response message to the first device 300 (S17070).

The methods described in FIGS. 9 and 17 of the present invention may be performed individually or through a combination of the plurality of methods.

The present invention described above may be substituted, modified and changed by a person having ordinary skill in the art to which the present invention pertains without departing from the technological spirit of the present invention, and thus is not restricted by the aforementioned embodiments and the accompanying drawings.

INDUSTRIAL APPLICABILITY

This specification relates to Bluetooth data transmission and reception and, more particularly, to a method and device for transmitting a message between devices in a mesh network using a Bluetooth low energy (LE) technology.

The invention claimed is:

1. A method for transmitting data from a first device to a second device in a Bluetooth mesh network, the method comprising:
   receiving, from the second device, a first advertising message including an indicator indicating whether the second device is included in the Bluetooth mesh network;
   accessing the Bluetooth mesh network including the second device, based on the first advertising message;
   receiving, from the second device, a second advertising message to monitor for the presence of the second device in the Bluetooth mesh network,
   wherein the second advertising message includes a first address for identifying the second device; and
   transmitting a control message including an operation code indicating a specific operation to the second device through the Bluetooth mesh network,
   wherein the control message includes at least one of a second address for identifying the first device, a third address for identifying a destination device to which the control message is transmitted, a relay count value, or a second type field indicating a type of the control message, wherein the second device compares the first address with the third address to determine whether the first address matches with the third address, and wherein the second device performs the specific operation when the first address matches with the third address.

2. The method of claim 1, further comprising:
receiving a response message in response to the control message from the second device when the control message is a message requiring a response.

3. The method of claim 1,
wherein the control message further includes an identifier for transmitting and receiving a message.

4. The method of claim 3,
wherein the control message further includes a first authentication code for authenticating the operation code and a parameter or a second authentication code for authenticating the control message.

5. The method of claim 1,
wherein the control message is received by a relay operation of at least one relay device.

6. The method of claim 5,
wherein the relay count value of relays is decremented each time it is relayed, and
wherein the first advertising message is not retransmitted, when the relay count value is '1'.

7. The method according to claim 1,
wherein the first advertising message is periodically broadcast.

8. The method according to claim 1, wherein the second advertising message is received from the second device.

9. A first device for transmitting data to a second device in a Bluetooth mesh network, the first device comprising:
a transceiver; and
a processor functionally connected to the transceiver,
wherein the processor is configured to:
receive, from the second device, a first advertising message including an indicator indicating whether the second device is included in the Bluetooth mesh network,
access the Bluetooth mesh network including the second device, based on the first advertising message,
receive a second advertising message from the second device to monitor for the presence of the second device in the Bluetooth mesh network, and
transmit a control message including an operation code indicating a specific operation to the second device through the Bluetooth mesh network, wherein the second advertising message includes a first address for identifying the second device, wherein the second advertising message is transmitted periodically, wherein the second device compares the first address with a third address to determine whether the first address matches with a second address, wherein the control message includes at least one of the second address for identifying the first device, the third address for identifying a destination device to which the control message is transmitted, a relay count value, or a second type field indicating a type of the control message, wherein the second device compares the first address with the third address to determine whether the first address matches with the third address, and wherein the second device performs the specific operation when the first address matches with the third address.

10. The method according to claim 1, wherein the second device relays the control message when the first address does not match with the third address.

* * * * *